United States Patent
Aimono et al.

(10) Patent No.: US 8,941,905 B2
(45) Date of Patent: Jan. 27, 2015

(54) OPTICAL DEFLECTOR

(71) Applicant: Stanley Electric Co., Ltd., Meguro-ku, Tokyo (JP)

(72) Inventors: Takanori Aimono, Tokyo (JP); Yoshiaki Yasuda, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 150 days.

(21) Appl. No.: 13/802,579

(22) Filed: Mar. 13, 2013

(65) Prior Publication Data
US 2013/0258432 A1  Oct. 3, 2013

(30) Foreign Application Priority Data
Mar. 29, 2012  (JP) .................................. 2012-078129

(51) Int. Cl.
G02B 26/08  (2006.01)
G02B 26/10  (2006.01)

(52) U.S. Cl.
CPC ............ *G02B 26/10* (2013.01); *G02B 26/0858* (2013.01); *G02B 26/105* (2013.01)
USPC .................... 359/199.4; 359/200.8; 359/224.1

(58) Field of Classification Search
CPC ................................................. G02B 26/0858
USPC .................. 359/199.4, 200.8, 224.1
See application file for complete search history.

(56) References Cited

U.S. PATENT DOCUMENTS

| 8,218,216 B2 | 7/2012 | Konno et al. |
| 8,649,078 B2 * | 2/2014 | Aimono et al. ............ 359/199.4 |
| 2011/0170156 A1 | 7/2011 | Takayama |

FOREIGN PATENT DOCUMENTS

JP  2008-249797 A  10/2008

OTHER PUBLICATIONS

Extended European Search Report (EESR) dated May 24, 2013 (in English) issued in counterpart European Application No. 13001251.1.

* cited by examiner

*Primary Examiner* — James Phan
(74) *Attorney, Agent, or Firm* — Holtz, Holtz, Goodman & Chick PC

(57) ABSTRACT

An optical deflector is provided which can effectively suppress occurrence of a ringing phenomenon when a piezoelectric actuator is driven with a voltage signal of a sawtooth waveform. An optical deflector A1 includes a control circuit 20 that detects a mechanical natural frequency relevant to swinging about a second axis X2 of a movable part 9. The control circuit 20 applies a voltage signal of a sawtooth waveform from which the natural frequency and a harmonic component thereof are removed to outside piezoelectric actuators 10a and 10b. The control circuit 20 removes a frequency component, which is equal to or greater than a second threshold value G2 within a predetermined frequency range out of frequency components of a voltage signal output from a detecting piezoelectric body 62, from a drive voltage.

3 Claims, 7 Drawing Sheets

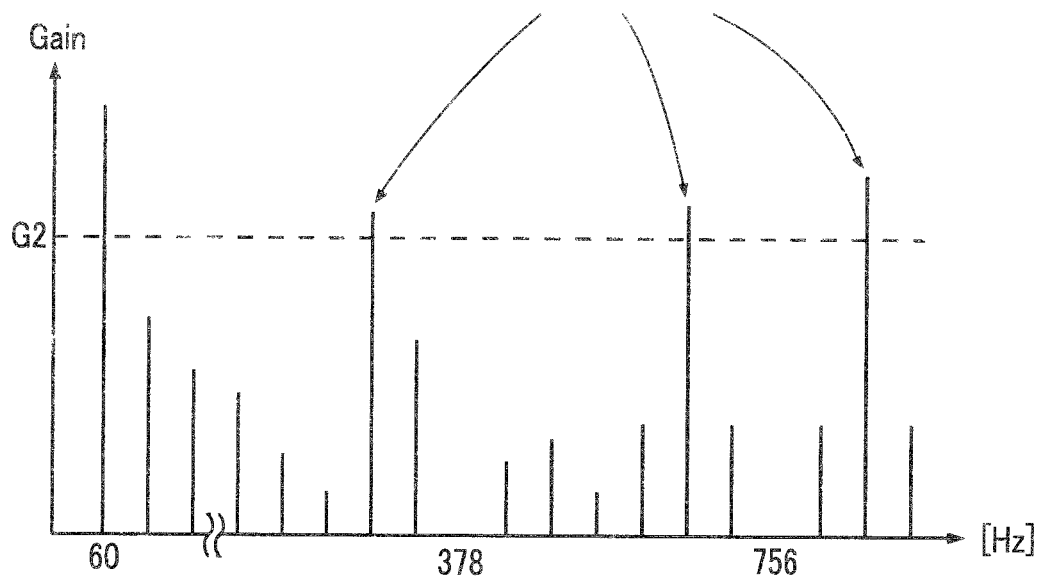

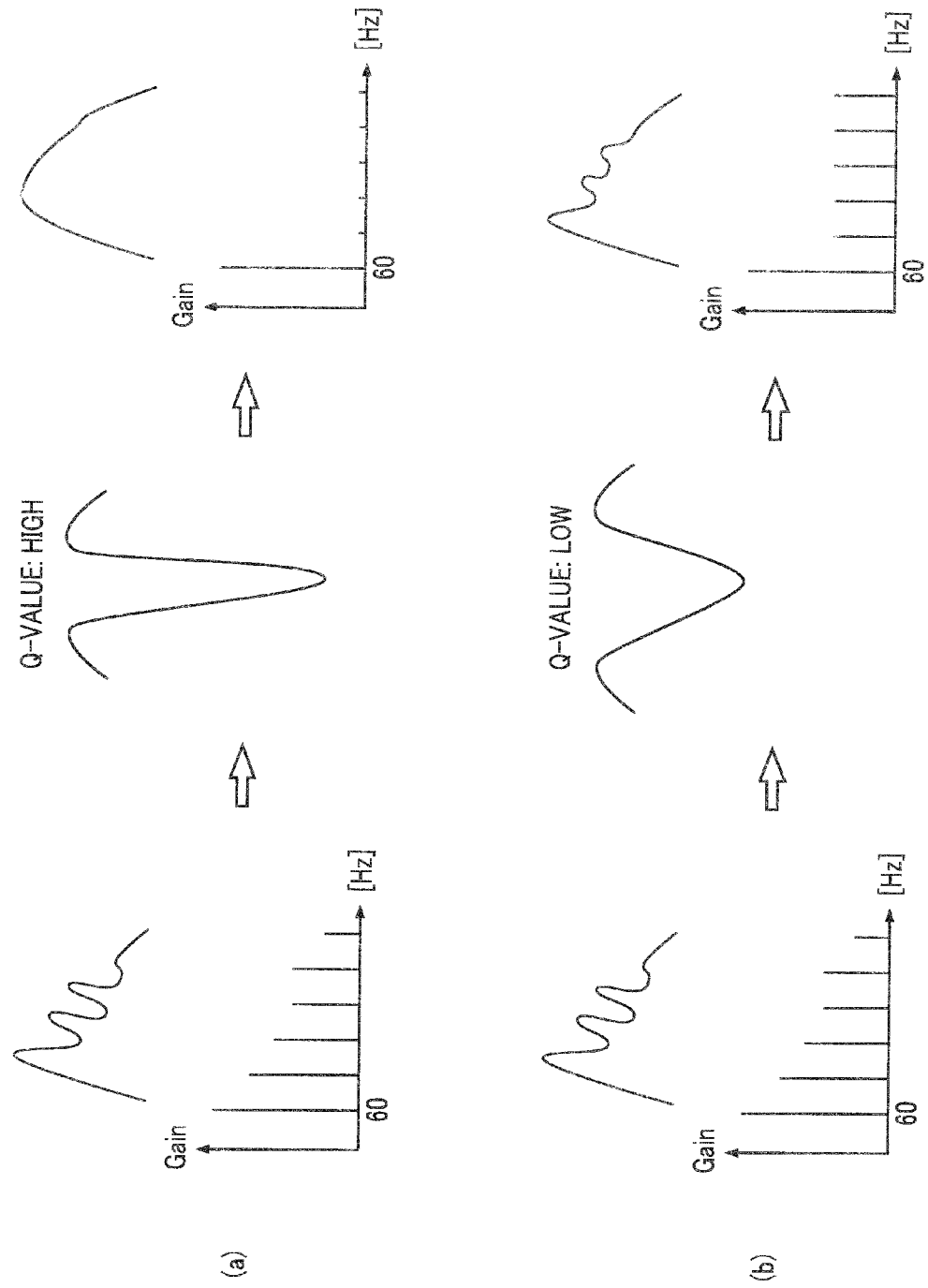

OPTICAL DEFLECTOR

BACKGROUND OF THE INVENTION

1. Field of the Invention

The present invention relates to an optical deflector which can swing a reflective plane.

2. Description of the Related Art

In the past, an optical deflector which includes a mirror part having a reflective plane and a pair of piezoelectric actuators actuating the mirror part was known (Patent Document 1). A waveform such as a sinusoidal waveform having periodicity is used for a voltage signal to be applied to the piezoelectric actuators of the optical deflector. In the optical deflector disclosed in Patent Document 1, voltage signals of a sawtooth waveform having periodicity and opposite phases are applied to the pair of piezoelectric actuators.

When such an optical deflector is used, for example, for an apparatus such as a projector which displays an image, unevenness in scanning speed causes deformation of an image in the scanning direction. Accordingly, only an area in which the scanning speed is constant is used to display an image. In order to keep the scanning speed constant, it is preferable that the voltage signals to be applied to the piezoelectric actuators be set to have a long straight (or substantially straight) section in one period.

A sawtooth waveform has a longer straight (or substantially straight) section in one period, compared with the sinusoidal waveform. Therefore, when the voltage signals to be applied to the piezoelectric actuators have a sawtooth waveform, the section in which the actuating speed of the minor part, that is, the scanning speed of the optical deflector, is constant can become longer in comparison with a case where the voltage signals have a sinusoidal waveform.

However, when the voltage signals have a sawtooth waveform, the optical deflector responds to the mechanical natural frequency relevant to the driving of the mirror part out of harmonic components included in the sawtooth waveform. Accordingly, a so-called ringing phenomenon occurs at the time of driving the mirror part and thus the scanning speed is not constant (speed uniformity degrades). Therefore, in the optical deflector disclosed in Patent Document 1, a natural frequency and the harmonic component of the natural frequency are removed from the harmonic components included in the sawtooth waveform.

CITATION LIST

Patent Document

Patent Document 1: Japanese Patent Application Laid-Open No. 2008-249797

SUMMARY OF THE INVENTION

However, in the optical deflector disclosed in Patent Document 1, it is not detected whether a ringing phenomenon occurs when the mirror part is actually actuated. That is, the harmonic components of the sawtooth waveform are removed on the basis of a predetermined natural frequency.

In the optical deflector, the mechanical natural frequency relevant to the driving of the mirror part varies depending on the manufacturing error or the state thereof. Accordingly, when the harmonic components of a sawtooth waveform are removed on the basis of the value of a predetermined natural frequency, the ringing phenomenon is not satisfactorily suppressed.

An object of the invention is to provide an optical deflector which can effectively suppress occurrence of a ringing phenomenon when a piezoelectric actuator is driven with a voltage signal of a sawtooth waveform.

According to an aspect of the invention, there is provided an optical deflector comprising: a mirror part configured to have a reflective plane; a support part configured to support the mirror part; a piezoelectric actuator of which one end is connected to the mirror part, of which the other end is connected to the support part, and which swings the mirror part about a predetermined axis relative to the support part by piezoelectric driving; a detecting piezoelectric element which outputs a detection voltage based on bending deformation due to vibration transmitted by the piezoelectric actuator; and a control unit configured to control a drive voltage to be applied to the piezoelectric actuator, wherein the control unit includes a natural frequency detecting unit configured to detect a mechanical natural frequency relevant to the swinging of the mirror part about the predetermined axis, a voltage signal generating unit configured to generate a voltage signal of a sawtooth waveform periodically repeating an increase and a decrease of a voltage value with a constant amplitude, and a removal unit configured to remove a predetermined frequency component, and wherein a voltage signal obtained by removing the natural frequency detected by the natural frequency detecting unit and a harmonic component of the natural frequency from the voltage signal generated by the voltage signal generating unit within a predetermined frequency range is applied as the drive voltage to the piezoelectric actuator, and thereafter a frequency component which is equal to or greater than a predetermined value within the predetermined frequency range, out of the frequency components of the detection voltage output from the detecting piezoelectric element, is removed from the drive voltage.

According to the present invention, the control unit detects the mechanical natural frequency relevant to swinging of the mirror part about the predetermined axis through the use of the natural frequency detecting unit. The control unit applies the voltage signal, which is obtained by removing the natural frequency detected by the natural frequency detecting unit and the harmonic component of the natural frequency within the predetermined frequency range from the voltage signal generated by the voltage signal generating unit, as the drive voltage to the piezoelectric actuator. Accordingly, even when the natural frequency varies depending on the manufacturing error or the like of the optical deflector, it is possible to detect an appropriate natural frequency.

However, even when such a voltage signal is applied, a ringing phenomenon may occur due to remaining resonance components other than the resonance frequency. The detection voltage output from the detecting piezoelectric element includes the actual driving of the optical deflector. That is, when resonance occurs due to the frequency components included in a signal for driving the optical deflector, the signal including the resonance components is included in the detection voltage.

Accordingly, actual scanning behavior for controlling the drive voltage on the basis of the detection voltage output from the detecting piezoelectric element (for removing the frequency component, which is equal to or greater than the predetermined value within the predetermined frequency range out of the frequency components of the detection voltage output, from the detecting piezoelectric element, from the drive voltage by applying a voltage signal) is fed back.

Therefore, even when the natural frequency varies depending on manufacturing error, disturbance, usage, or the like, it is possible to appropriately suppress the ringing phenomenon. At this time, since the frequency components are removed only within the predetermined frequency range, it is possible to suppress degradation in scanning speed uniformity of the optical deflector. Accordingly, it is possible to secure a scanning section which can be effectively used without increasing a deflection angle of the optical deflector.

In the aspect of the invention, it is preferable that the natural frequency detecting unit include a sinusoidal wave generating unit configured to generate a voltage signal of a sinusoidal waveform, that the sinusoidal wave generating unit generate a voltage signal of a sinusoidal waveform for each frequency in the range of a predetermined first frequency to a second frequency, and that the natural frequency detecting unit detect the frequency of the sinusoidal waveform, which is equal to or greater than a predetermined value out of the frequency components of the detection voltage output from the detecting piezoelectric element when the voltage signals of the sinusoidal waveform generated by the sinusoidal wave generating unit are applied to the piezoelectric actuator, as the natural frequency.

Accordingly, the natural frequency is detected on the basis of the voltage signal output from the detecting piezoelectric element. In this wing, since the natural frequency is detected from the actual behavior, of the optical deflector, it is possible to accurately detect the natural frequency and it is also possible to more effectively suppress the ringing phenomenon.

In the aspect of the invention, it is preferable that the piezoelectric actuator include a plurality of piezoelectric cantilevers configured to be bending-deformed by piezoelectric driving, that the plurality of piezoelectric cantilevers be arranged side by side so as to neighbor both ends of each piezoelectric cantilever, that the ends be mechanically connected to fold back to the neighboring piezoelectric cantilever so as to accumulate the bending deformation, and that the respective piezoelectric cantilevers be formed to be bending-deformed in a direction perpendicular to the arranging direction of the piezoelectric cantilevers.

Accordingly, even when the individual piezoelectric cantilevers have small bending deformation, the bending deformation can be accumulated and it is thus possible to obtain a large deflection angle. Therefore, it is possible to actuate the mirror part of the optical deflector at frequencies other than the resonance frequency instead of the resonance frequency.

BRIEF DESCRIPTION OF THE DRAWINGS

FIG. 5 is a diagram illustrating a ringing removing process in a control circuit of the optical deflector according to the embodiment; and FIGS. 6A and 6B are diagrams illustrating a method of setting a Q-value of a notch filter in the optical deflector according to the embodiment.

DESCRIPTION OF THE PREFERRED EMBODIMENTS

An optical deflector according to an embodiment of the invention will be described below.

Figure 1:
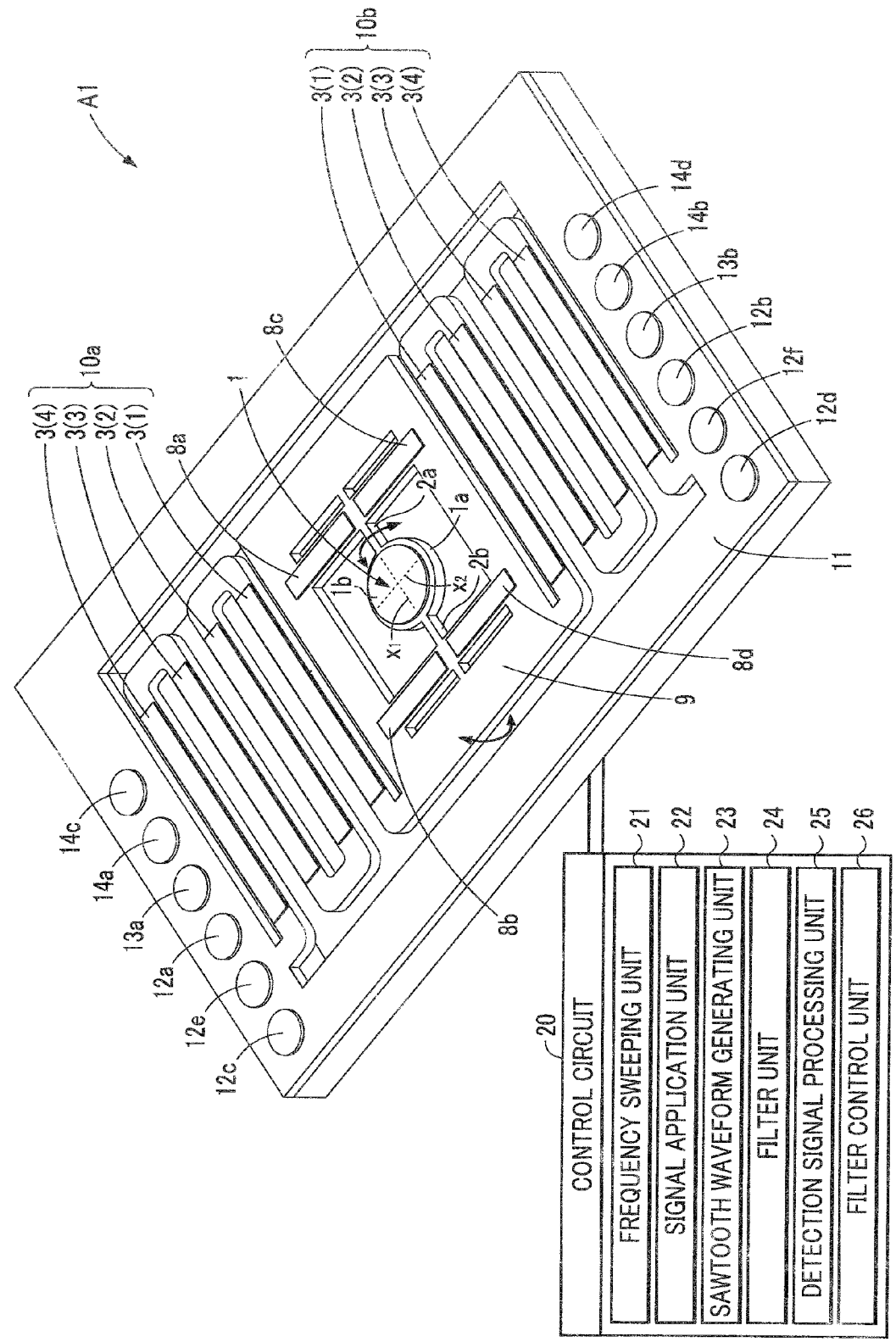
FIG. 1 is a perspective view illustrating a configuration of an optical deflector according to an embodiment of the invention.

As illustrated in FIG. 1, an optical deflector A1 according to the present embodiment includes a reflection part 1 that reflects incident light, a movable part 9 on which the reflection part 1 is mounted, piezoelectric actuators 8a, 8b, 8c, and 8d that swing the reflection part 1 about a first axis X1 relative to the movable part 9, and piezoelectric actuators 10a and 10b that swing the reflection part 1 and the movable part 9 about a second axis X2 relative to a support base 11.

The reflection part 1 includes a disk-like reflection part base 1a and a thin metal film 1b formed as a light-reflecting plane on a reflection part base 1a, and a pair of torsion bars 2a and 2h extends outward from both ends in a diameter direction of the reflection part base 1a. The reflection part 1 is connected to the movable part 9 with the torsion bars 2a and 2b interposed therebetween and is mounted on the movable part 9.

Specifically, the movable part 9 is formed in a rectangular frame shape to surround the reflection part 1. The tip portions of the torsion bars 2a and 2b extending from the reflection part base 1a are connected to the inner peripheral portion of the movable part 9. Accordingly, the reflection part 1 is connected to the movable part 9 with the torsion bars 2a and 2h interposed therebetween and can swing about the first axis X1, which is the axis of the torsion bars 2a and 2b, by the torsion of the torsion bars 2a and 2b.

Two pairs of piezoelectric actuators 8a to 8d swinging the reflection part 1 relative to the movable part 9 are provided in the present embodiment. One pair of piezoelectric actuators 8a and 8c is disposed inside the movable part 9 so as to face each other with the torsion bar 2a interposed therebetween. The other pair of piezoelectric actuators 8b and 8d is disposed inside the movable part 9 so as to face each other with the torsion bar 2b interposed therebetween.

Hereinafter, the piezoelectric actuators 8a to 8d are referred to as inside piezoelectric actuators 8a to 8d. When the inside piezoelectric actuators 8a to 8d do not need to be distinguished, they are generically referred to as the inside piezoelectric actuators 8.

Each inside piezoelectric actuator 8 is formed of a piezoelectric cantilever configured to be bending-deformed by piezoelectric driving. One pair of inside piezoelectric actuators 8a and 8c extends in a direction perpendicular to the torsion bar 2a (a direction perpendicular to the first axis X1), the tip portions thereof are connected to the torsion bar 2a, and the base end portions thereof are connected to the inner peripheral portions of the movable part 9.

Similarly, the piezoelectric actuators 8b and 8d extend in a direction perpendicular to the torsion bar 2b (a direction perpendicular to the first axis X1), the tip portions thereof are connected to the torsion bar 2b, and the base end portions thereof are connected to the inner peripheral portions of the movable part 9.

The support base 11 is formed in a rectangular frame shape so as to surround the movable part 9. A pair of piezoelectric actuators 10a and 10b swinging the reflection part 1 and the movable part 9 relative to the support base 11 is disposed between an inner peripheral portion of the support base 11 and an outer peripheral portion of the movable part 9 so as to face each other in the direction of the second axis X2 (the direction perpendicular to the first axis X1) with the movable part 9 interposed therebetween, and the movable part 9 is supported by the support base 11 with the piezoelectric actuators 10a and 10b interposed therebetween.

Hereinafter, the piezoelectric actuators 10a and 10b are referred to as outside piezoelectric actuators 10a and 10b. When the outside piezoelectric actuators 10a and 10b do not need to be distinguished, they are generically referred to as outside piezoelectric actuators 10.

Each outside piezoelectric actuator 10 is formed by connecting plural (four in the illustrated example) piezoelectric cantilevers 3($i$) (where i=1, 2, 3, 4) configured to be bending-deformed by piezoelectric driving. In this case, a plurality of the piezoelectric cantilevers 3($i$) (where i=1, 2, 3, 4) of each outside piezoelectric actuator 10 extend in the direction perpendicular to the second axis X2 (the same direction as the first axis X1) between the inner peripheral portion of the support base 11 and the outer peripheral portion of the movable part 9, are arranged with a gap therebetween in the direction of the second axis X2, and are connected so that each piezoelectric cantilever is folded to the neighboring piezoelectric cantilever. Therefore, each outside piezoelectric actuator 10 extends to meander with the direction perpendicular to the second axis X2 as an amplitude direction.

One end (the base end portion of the piezoelectric cantilever 3(4) closest to the support base 11) of each outside piezoelectric actuator 10 is connected to the inner peripheral portion of the support base 11, and the other end (the tip portion of the piezoelectric cantilever 3(1) closest to the movable part 9) thereof is connected to the outer peripheral portion of the movable part 9.

Accordingly, the movable part 9 is supported by the support base 11 with the outside piezoelectric actuators 10a and 10b interposed therebetween and can swing about the second axis X2 relative to the support base 11 by bending deformation of the piezoelectric cantilevers 3($i$) (where i=1, 2, 3, 4) of each piezoelectric actuator 10.

In the following description, the piezoelectric cantilevers 3($i$) (where i=1, 2, 3, 4) of each piezoelectric actuator 10 may be referred to as first, second, third, and fourth piezoelectric cantilevers sequentially from the movable part 9 side, the piezoelectric cantilevers 3(1) and 3(3) may be referred to as odd-numbered piezoelectric cantilevers 3(odd), and the piezoelectric cantilevers 3(2) and 3(4) may be referred to as even-numbered piezoelectric cantilevers 3(even).

In the optical deflector A1 illustrated in the drawings, the number of piezoelectric cantilevers 3($i$) of each outside piezoelectric actuator 10 is four, but each outside piezoelectric actuator 10 may include more piezoelectric cantilevers 3($i$).

Figure 2:
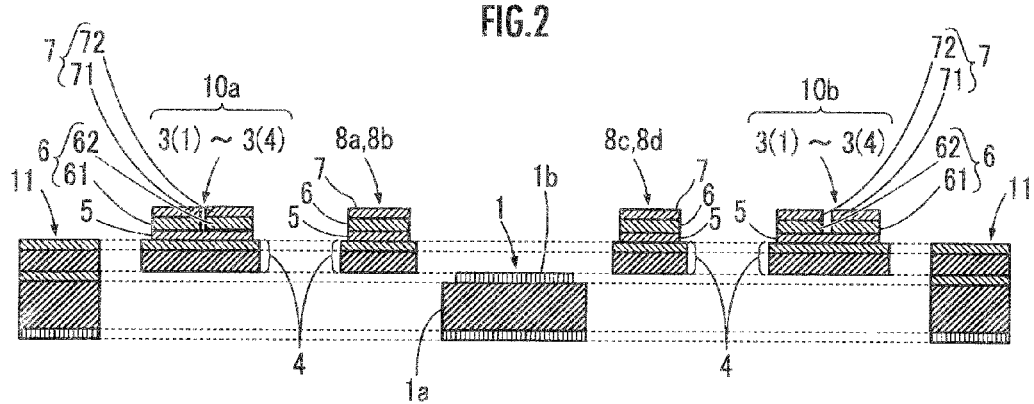
FIG. 2 is a cross-sectional view schematically illustrating the structure of a piezoelectric cantilever or the like of the optical deflector illustrated in FIG. 1.

Each of the inside piezoelectric actuators 8a to 8d and each of the piezoelectric cantilevers 3($i$) (where i=1, 2, 3, 4) of the outside piezoelectric actuators 10a and 10b are a piezoelectric cantilever having a structure in which a lower electrode 5, a piezoelectric body 6, and an upper electrode 7 are stacked on a support body 4 as a strain-inducing body (cantilever body), as illustrated in the schematic cross-sectional view of FIG. 2. The support body 4 is bending-deformed along with the piezoelectric body 6 by applying a drive voltage to the piezoelectric body 6 between the lower electrode 5 and the upper electrode 7.

The piezoelectric body 6 constituting each of the piezoelectric cantilevers 3($i$) (where i=1, 2, 3, 4) of the outside piezoelectric actuators 10a and 10b includes a driving piezoelectric body 61 for driving the corresponding piezoelectric cantilever 3($i$) (where i=1, 2, 3, 4) and a detecting piezoelectric body 62 outputting a voltage depending on the bending deformation due to vibration transmitted to the corresponding piezoelectric cantilever 3($i$) (where i=1, 2, 3, 4) by the driving. The driving piezoelectric body 61 and the detecting piezoelectric body 62 are two-dimensionally separated from each other and are disposed on the lower electrode 5.

The upper electrode 7 of each of the piezoelectric cantilevers 3($i$) (where i=1, 2, 3, 4) of the outside piezoelectric actuators 10a and 10b includes a driving upper electrode 71 disposed on the driving piezoelectric body 61 and a detecting upper electrode 72 disposed on the detecting piezoelectric body 62. At this time, the driving upper electrode 71 and the detecting upper electrode 72 are two-dimensionally separated from each other.

When the driving piezoelectric body 61 and the detecting piezoelectric body 62 do not need to be distinguished, they are simply referred to as a piezoelectric body 6. Similarly, when the driving upper electrode 71 and the detecting upper electrode 72 do not need to be distinguished, they are simply referred to as an upper electrode 7. Since the detecting piezoelectric body and upper electrodes do not exist in the inside piezoelectric actuator 8, the piezoelectric body 6 and the upper electrode 7 of each of the inside piezoelectric actuators 8 mean the driving piezoelectric body and the driving upper electrode. In the present embodiment, the detecting piezoelectric body and the detecting upper electrode are not provided to the inside piezoelectric actuators 8, but may be provided thereto.

A connecting portion between the neighboring piezoelectric cantilevers 3($k$) and 3($k$+1) (where k=1, 2, 3) of the outside piezoelectric actuators 10a and 10b is a portion connecting the support bodies 4 of the neighboring piezoelectric cantilevers 3($k$) and 3($k$+1), and the layers of the piezoelectric body 6 and the upper electrode 7 (or the layers of the lower electrode 5, the piezoelectric body 6, and the upper electrode 7) are not disposed in the connecting portion.

The optical deflector A1 includes an upper electrode pad 12a used to apply a drive voltage between the upper electrode 7 and the lower electrode 5 of each of the inside piezoelectric actuators 8a and 8b and an upper electrode pad 12b used to apply a drive voltage between the upper electrode 7 and the lower electrode 5 of each of the piezoelectric actuator 8c and 8d on the support base 11.

The optical deflector A1 includes an upper electrode pad 12c, an upper electrode pad 12e, an upper electrode pad 12d, and an upper electrode pad 12f on the support base 11. Here, the upper electrode pad 12c is an electrode pad used to apply a drive voltage between the driving upper electrode 71 and the lower electrode 5 of each of the odd-numbered piezoelectric cantilevers 3(odd) of the outside piezoelectric actuator 10a. The upper electrode pad 12e is an electrode pad used to apply a drive voltage between the driving upper electrode 71 and the lower electrode 5 of each of the even-numbered piezoelectric cantilevers 3(even) of the outside piezoelectric actuator 100a.

The upper electrode pad 12d is an electrode pad used to apply a drive voltage between the driving upper electrode 71 and the lower electrode 5 of each of the odd-numbered piezoelectric cantilevers 3(odd) of the outside piezoelectric actuator 10b. The upper electrode pad 12f is an electrode pad used to apply a drive voltage between the driving upper electrode 71 and the lower electrode 5 of each of the even-numbered piezoelectric cantilevers 3(even) of the outside piezoelectric actuator 10b.

The optical deflector A1 includes an upper electrode pad 14a, an upper electrode pad 14c, an upper electrode pad 14b, and an upper electrode pad 14d on the support base 11. Here, the upper electrode pad 14a is an electrode pad used to apply a drive voltage between the detecting upper electrode 72 and the lower electrode 5 of each of the odd-numbered piezoelectric cantilever 3(odd) of the outside piezoelectric actuator 10a. The upper electrode pad 14c is an electrode pad used to apply a drive voltage between the detecting upper electrode 72 and the lower electrode 5 of each of the even-numbered piezoelectric cantilever 3(even) of the outside piezoelectric actuator 10a.

The upper electrode pad 14b is an electrode pad used to apply a drive voltage between the detecting upper electrode 72 and the lower electrode 5 of each of the odd-numbered piezoelectric cantilever 3(odd) of the outside piezoelectric actuator 10b. The upper electrode pad 14d is an electrode pad used to apply a drive voltage between the detecting upper electrode 72 and the lower electrode 5 of each of the even-numbered piezoelectric cantilever 3(even) of the outside piezoelectric actuator 10b.

The optical deflector A1 includes a lower electrode pad 13a common to the upper electrode pads 12a, 12c, 12c, 14a, and 14c and a lower electrode pad 13b common to the upper electrode pads 12b, 12d, 12f, 14b, and 14d on the support base 11.

The lower electrodes 5 and the lower electrode pads 13a and 13b are formed by profiling a thin metal film (a two-layered thin metal film in the present embodiment, which is hereinafter also referred to as a lower electrode layer) on a semiconductor substrate (for example, a silicon substrate) constituting the support body 4 through the use of a semiconductor planar process. Regarding the material of the thin metal film, titanium (Ti) is used for the first layer (lower layer) and platinum (Pt) is used for the second layer (upper layer), for example.

In this case, the lower electrode 5 of each inside piezoelectric actuator 8 (piezoelectric cantilever) is formed almost on the overall surface of the support body 4 of the inside piezoelectric actuator 8, and the lower electrodes 5 of the piezoelectric cantilevers 3(i) (where i=1, 2, 3, 4) of each outside piezoelectric actuator 10 are formed almost on the overall surfaces of the support bodies 4 (overall including the linear portion (a linearly-extending portion of each piezoelectric cantilever 3(i)) and a connecting portion). The lower electrode pads 13a and 13b are electrically connected to the lower electrodes 5 of the inside piezoelectric actuators 8a and 8b, the lower electrodes 5 of the inside piezoelectric actuators 8c and 8d, the lower electrodes 5 of the outside piezoelectric actuator 10a, and the lower electrodes 5 of the outside piezoelectric actuator 10b via the lower electrode layer formed on the support base 11 and the movable part 9.

The piezoelectric body 6 of each of the inside piezoelectric actuators 8 (piezoelectric cantilever) and the piezoelectric cantilevers 3(i) (where i=1, 2, 3, 4) of the outside piezoelectric actuators 10 is separated from each other and is formed on the lower electrode 5 of the corresponding piezoelectric cantilever by profiling a single-layered piezoelectric film (hereinafter, also referred to as a piezoelectric layer) on the lower electrode layer through the use of a semiconductor planar process. For example, lead zirconate titanate (PZT) which is a piezoelectric material is used as the material of the piezoelectric film.

In this case, the piezoelectric body 6 of each inside piezoelectric actuator 8 is formed almost on the overall surface of the lower electrode 5 of the corresponding inside piezoelectric actuator 8. The driving piezoelectric body 61 of each of the outside piezoelectric actuators 10a and 10b is formed on the lower electrode 5 in the extending portion (linear portion) of each piezoelectric cantilever 3(i) (where i=1, 2, 3, 4) with a width of about half the width of the lower electrode 5 and with the same length as the length of the lower electrode 5. The detecting piezoelectric body 62 of each of the outside piezoelectric actuators 10a and 10b is formed on the lower electrode 5 in the extending portion (linear portion) of each piezoelectric cantilever 3(i) (where i=1, 2, 3, 4) with a width of about half the width of the lower electrode 5 and with the same length as the length of the lower electrode 5. As described above, the driving piezoelectric body 61 and the detecting piezoelectric body 62 are two-dimensionally separated from each other.

The upper electrodes 7, the upper electrode pads 12a to 12f, and upper electrode wires (not illustrated) electrically connecting them are formed by profiling a thin metal film (a single-layered thin metal film in the present embodiment, which is also referred to as an upper electrode layer) on the piezoelectric layer through the use of a semiconductor planar process. Examples of the material of the thin metal film include platinum (Pt) and gold (Au).

In this case, the upper electrode 7 of each inside piezoelectric actuator 8 is formed almost on the overall surface of the piezoelectric body 6 of each piezoelectric cantilever. The driving upper electrode 71 of each outside piezoelectric actuator 10 is formed almost on the overall surface of the driving piezoelectric body 61 of each piezoelectric cantilever. Similarly, the detecting upper electrode 72 of each outside piezoelectric actuator 10 is formed almost on the overall surface of the detecting piezoelectric body 62 of each piezoelectric cantilever.

The upper electrode pads 12a and 12b are electrically connected to the upper electrodes 7 of the inside piezoelectric actuators 8a and 8b and the upper electrodes 7 of the inside piezoelectric actuators 8c and 8d via upper electrode wires (not illustrated), respectively.

The upper electrode pads 12c to 12f are electrically connected to the driving upper electrodes 71 of the odd-numbered piezoelectric cantilevers 3(odd) of the outside piezoelectric actuator 10a, the driving upper electrodes 71 of the odd-numbered piezoelectric cantilevers 3(odd) of the outside piezoelectric actuator 10b, the driving upper electrodes 71 of the even-numbered piezoelectric cantilevers 3(even) of the outside piezoelectric actuator 10a, and the driving upper electrodes 71 of the even-numbered piezoelectric cantilevers 3(even) of the outside piezoelectric actuator 10b via upper electrode wires (not illustrated), respectively.

The upper electrode pads 14a to 14d are electrically connected to the detecting upper electrodes 72 of the odd-numbered piezoelectric cantilevers 3(odd) of the outside piezoelectric actuator 10a, the detecting upper electrodes 72 of the odd-numbered piezoelectric cantilevers 3(odd) of the outside piezoelectric actuator 10b, the detecting upper electrodes 72 of the even-numbered piezoelectric cantilevers 3(even) of the outside piezoelectric actuator 10a, and the detecting upper electrodes 72 of the even-numbered piezoelectric cantilevers 3(even) of the outside piezoelectric actuator 10b via upper electrode wires (not illustrated), respectively.

The thin metal film 1b constituting the reflective plane of the reflection part 1 is formed by profiling a thin metal film (a single-layered thin metal film in the present embodiment) on the reflection part base 1a through the use of a semiconductor planar process. Examples of the material of the thin metal film include gold (Au), platinum (Pt), silver (Ag), and aluminum (Al).

The reflection part base 1a, the torsion bars 2a and 2b, the support body 4, the movable part 9, and the support base 11 are formed as a unified body by profiling a semiconductor substrate (silicon substrate) having multiple layers. Examples of the technique of profiling a semiconductor substrate include semiconductor planar process using a photolithography technique or a dry etching technique and an MEMS process.

The optical deflector A1 is connected to a control circuit 20 controlling the swinging (deflecting and scanning) of the reflection part 1. The control circuit 20 is an electronic circuit unit including a CPU, a processor, and a storage unit. The control circuit 20 controls the drive voltages to be applied to the inside piezoelectric actuators 8 and the outside piezoelectric actuator 10.

Here, in the optical deflector A1 according to the present embodiment, the movable part 9 corresponds to the "mirror part" in the present invention, the outside piezoelectric actuators 10a and 10b correspond to the "piezoelectric actuator" in the present invention, the support base 11 corresponds to the "support part" in the present invention, the second axis X2 corresponds to the "predetermined axis" in the present invention, the detecting piezoelectric body 62 corresponds to the "detecting piezoelectric element" in the present invention, and the control circuit 20 corresponds to the "control unit" in the present invention.

The operation of the optical deflector A1 according to the present embodiment will be described below.

The optical deflector A1 is disposed in an image display apparatus such as an electrophotographic image forming apparatus or a scanning display, and deflects and scans light incident on the reflection part 1 to an image projection plane or the like.

In this case, the swinging of the reflection part 1 about the first axis X1 is performed by piezoelectrically driving the inside piezoelectric actuators 8a to 8d, and the swinging of the reflection part 1 about the second axis X2 by piezoelectrically driving the outside piezoelectric actuators 10a and 10b. The swinging of the reflection part 1 about the first axis X1 and the swinging of the reflection part 1 about the second axis X2 are, for example, swinging operations for deflecting and scanning in the horizontal direction and deflecting and scanning in the vertical direction, respectively.

The swinging of the reflection part 1 about the first axis X1 is performed as follows. That is, the control circuit 20 applies a first voltage between the upper electrode 7 and the lower electrode 5 of each of the inside piezoelectric actuators 8a and 8b, and applies a second voltage between the upper electrode 7 and the lower electrode 5 of each of the inside piezoelectric actuators 8c and 8d. In this case, the first voltage and the second voltage are AC voltages (for example, of a sinusoidal waveform) of a predetermined frequency having opposite phases or having different phases.

Accordingly, one pair of inside piezoelectric actuators 8a and 8c is piezoelectrically driven so as to be bending-deformed in the opposite directions, and the other pair of inside piezoelectric actuators 8b and 8d is piezoelectrically driven so as to be bending-deformed in the opposite directions. The torsional deformation of the torsion bars 2a and 2b are caused due to the bending deformation. Consequently, the reflection part 1 swings about the first axis X1. Accordingly, light deflecting and scanning operations about the first axis X1 are performed.

The swinging of the reflection part 1 about the second axis X2 is performed as follows. The control circuit 20 outputs a first drive voltage for piezoelectrically driving the even-numbered piezoelectric cantilevers 3(even) of the outside piezoelectric actuators 10a and 10b and outputs a second drive voltage for piezoelectrically driving the odd-numbered piezoelectric cantilevers 3(odd) of the outside piezoelectric actuators 10a and 10b. Here, the second drive voltage is a voltage signal of a waveform having the opposite phase to the waveform of the first drive voltage.

At this time, the control circuit 20 piezoelectrically drives the piezoelectric cantilevers 3(even) to bending-deform the piezoelectric cantilevers by applying the first drive voltage between the lower electrode 5 and the driving upper electrode 71 of each of the even-numbered piezoelectric cantilevers 3(even) of the outside piezoelectric actuators 10a and 10b. At the same time, the control circuit 20 piezoelectrically drives the piezoelectric cantilevers 3(odd) to bending-deform the piezoelectric cantilevers by applying the second drive voltage between the lower electrode 5 and the driving upper electrode 71 of each of the odd-numbered piezoelectric cantilevers 3(odd) of the outside piezoelectric actuators 10a and 10b.

Accordingly, the even-numbered piezoelectric cantilevers 3(even) are bending-deformed so that the tip portion (the connecting portion to the movable part 9) of the piezoelectric cantilever 3(4) and the tip portion (the connecting portion to the piezoelectric cantilever 3(3)) of the piezoelectric cantilever 3(2) are displaced in the same direction (the upward direction in the illustrated example) relative to the base end portions of the piezoelectric cantilevers 3(4) and 3(2). The odd-numbered piezoelectric cantilevers 3(odd) are bending-deformed so that the tip portion (the connecting portion to the piezoelectric cantilever 3(4)) of the piezoelectric cantilever 3(3) and the tip portion (the connecting portion to the piezoelectric cantilever 3(2)) of the piezoelectric cantilever 3(1) are displaced in the opposite direction (the downward direction in the illustrated example) to the direction in the piezoelectric cantilevers 3(even) relative to the base end portions of the piezoelectric cantilevers 3(3) and 3(1).

Accordingly, the reflection part 1 swings about the second axis X2. Specifically, the deflection angle (the degree of swinging) of the reflection part 1 varies in a waveform following the waveforms of the first drive voltage and the second drive voltage.

In the optical deflector A1 according to the present embodiment, the outside piezoelectric actuators 10a and 10b are formed so that the thickness is 35 [μm], the total length of each piezoelectric cantilever $3(i)$ (where i=1, 2, 3, 4) is 35 [mm], and the width of each piezoelectric cantilever $3(i)$ (where i=1, 2, 3, 4) is 0.2 [mm], and the spring constant of the outside piezoelectric actuators 10a and 10b is $4.5 \times 10^{-3}$ [N/m$^2$].

Figure 3:
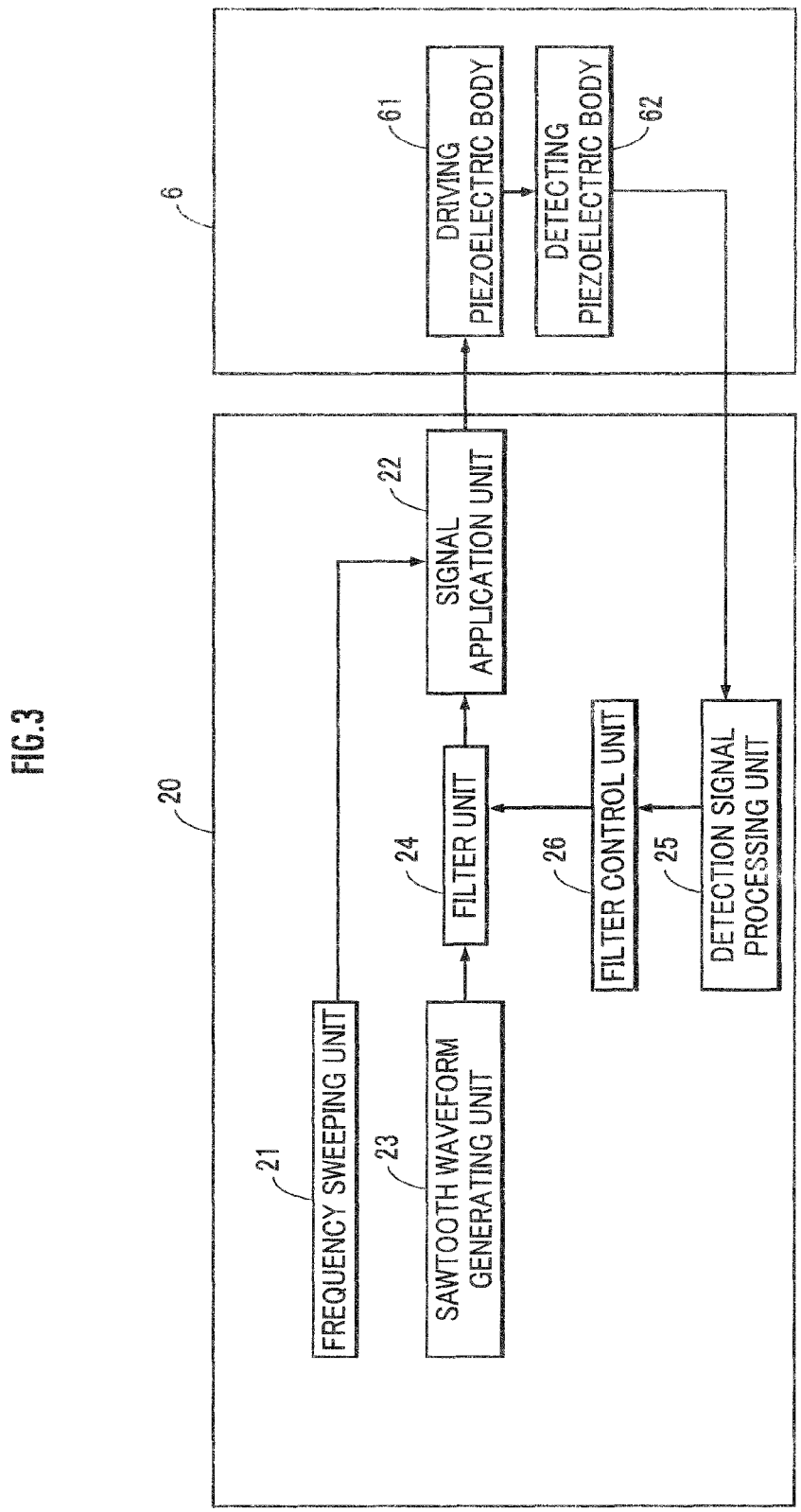
FIG. 3 is a functional block diagram illustrating the optical deflector according to the embodiment.

The control of the first drive voltage and the second drive voltage in the control circuit 20 will be described below. Since the first drive voltage and the second drive voltage are only voltage signals having the opposite phases, the first drive voltage and the second drive voltage are not distinguished and are referred to as an outside drive voltage. As illustrated in FIG. 3, the control circuit 20 includes a frequency sweeping unit 21, a signal application unit 22, a sawtooth wave generating unit 23, a filter unit 24, a detection signal processing unit 25, and a filter control unit 26.

The frequency sweeping unit 21 is an oscillation circuit that generate a sinusoidal waveform, and can set a frequency every 1 [Hz] in the range of 1 [Hz] to 1 [kHz]. The frequency sweeping unit 21 activates when starting the use of the optical deflector A1 or the like. The frequency sweeping unit 21 increases the frequency of the generated sinusoidal wave for each 1 [Hz] from 1 [Hz] to 1 [kHz] at the time of activation. At this time, the generated voltage signal of the sinusoidal waveform is fixed to 10 [V] in crest value.

The signal application unit 22 is a circuit that applies a signal input from the outside as the external drive voltage to the outside piezoelectric actuators 10a and 10b. That is, the signal application unit 22 applies the signal input from the outside between the upper electrode pads 12c to 12f and the lower electrode pads 13a and 13b (hereinafter, this application of signal is merely referred to as "apply the signal to the outside piezoelectric actuator 10"). Accordingly, a potential difference is generated between the driving upper electrode 71 and the lower electrode 5 of each piezoelectric cantilever 3(i) (where i=1, 2, 3, 4) of the outside piezoelectric actuators 10a and 10b and the driving piezoelectric body 61 is piezoelectrically driven.

When the frequency sweeping unit 21 is activated and a signal output from the frequency sweeping unit 21 is input such as when the use of the optical deflector A1 is started, the signal application unit 22 applies the input signal to the outer piezoelectric actuators 10. When a signal output from the filter unit 24 is input, the signal application unit 22 applies the input signal to the outside piezoelectric actuators 10. The signal from the frequency sweeping unit 21 and the signal from the filter unit 24 are not simultaneously input to the signal application unit 22.

Figure 7A:
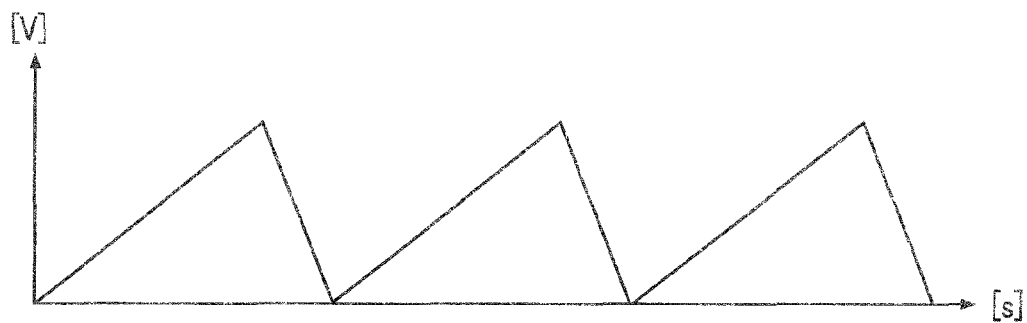
FIG. 7A is a diagram illustrating a voltage signal generated by a sawtooth waveform generating unit of the optical deflector according to the embodiment.

The sawtooth waveform generating unit 23 is an electronic circuit including an operational amplifier so as to generate a sawtooth waveform shown in FIG. 7A. The shapes (such as the frequency, the amplitude, and the ratio of the rising section and the falling section) of the sawtooth waveform are appropriately set depending on the usage of the optical deflector A1. In the present embodiment, from the viewpoint of securing linearity, the ratio of the "rising section" and the "falling section" is set to "9:1".

The filter unit 24 includes a notch filter (not illustrated) for removing a predetermined frequency component and a low-pass filter (not illustrated) for passing only components lower than a predetermined frequency. The filter unit 24 is configured to be able to change the characteristics of the notch filter, that is, what frequency component should be removed, from the outside. Specifically, the notch filter is a circuit including a variable resistor and a variable capacitor and can change the characteristics by changing the resistance value of the variable resistor or the capacitance value of the variable capacitor.

The voltage signal (hereinafter, referred to as "detection signal") output from the detecting piezoelectric bodies 62 of the outside piezoelectric actuators 10a and 10b are input to the detection signal processing unit 25. Specifically, the voltage signal corresponding to the bending deformation is output from the detecting piezoelectric bodies 62 when the piezoelectric cantilevers 3(i) (where i=1, 2, 3, 4) of the outside piezoelectric actuators 10a and 10b are bending-deformed. The output voltage signal is output as a potential difference between the upper electrode pads 14a to 14d and the lower electrode pads 13a and 13b via the detecting upper electrode 72 and the lower electrode 5. This output is input to the detection signal processing unit 25.

The detection signal processing unit 25 transforms the input signal to a frequency domain through the use of Fourier transform or the like and performs roughly one of the following two signal processes. One signal process is a natural frequency detecting process which is performed when a drive voltage of a sinusoidal waveform output from the frequency sweeping unit 21 is applied to the outside piezoelectric actuators 10a and 10b. The other signal process is a ringing removing process which is performed when the output of the sawtooth waveform output from the sawtooth waveform generating unit 23 and passing through the filter unit 24 is applied as the drive voltage to the outside piezoelectric actuators 10a and 10b.

In the natural frequency detecting process, the signal input to the detection signal processing unit 25 is transformed to the frequency domain and it is then determined whether a gain is equal to or greater than a predetermined value (hereinafter, referred to as a "first threshold value") G1. Here, the gain means a value of each frequency when a waveform in the time domain is transformed to the frequency domain through the use of Fourier transform.

The detection signal processing unit 25 detects the frequency of which the gain is equal to or greater than the first threshold value G1 as the mechanical natural frequency of the optical deflector A1. Here, the first threshold value G1 is set by experiments or the like and is stored in a storage unit in advance. For example, the first threshold value G1 is a value which is 60 times the gain when a voltage signal of a sinusoidal waveform of a frequency other than the natural frequency is applied.

The first threshold value varies depending on various conditions such as the positions of the detecting piezoelectric bodies 62 and is not limited to this value. The first threshold value G1 has only to be set to a value which can be used to determine that a voltage signal of a sinusoidal waveform of the mechanical natural frequency of the optical deflector A1 (specifically, the mechanical natural frequency relevant to the swinging of the movable part 9 about the second axis X2) is applied.

Figure 4:
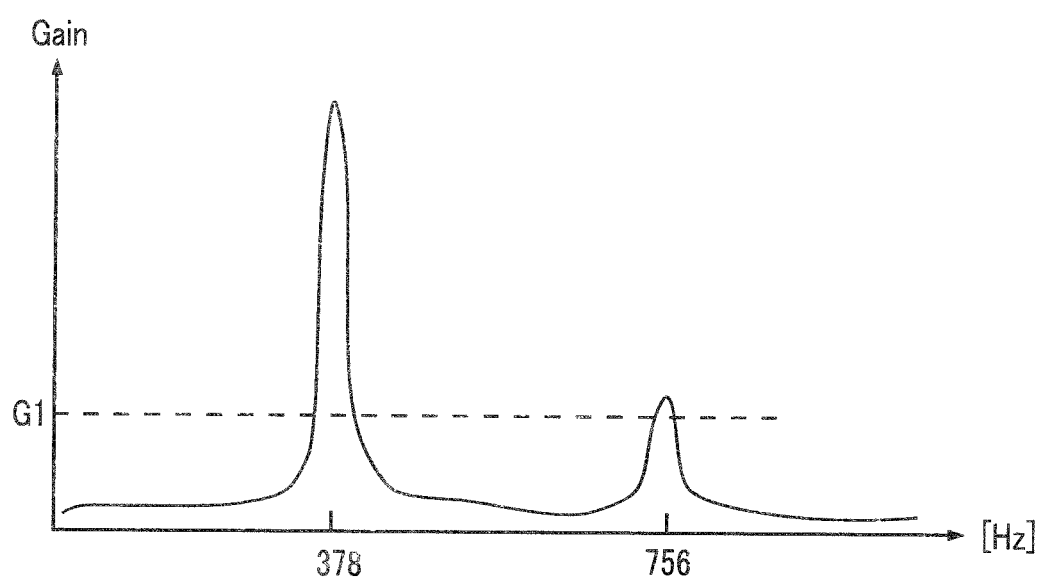
FIG. 4 is a diagram illustrating a mechanical natural frequency relevant to swinging of a movable part of the optical deflector according to the embodiment.

In the optical deflector A1 according to the present embodiment, the natural frequency of the optical deflector A1 could be ascertained at 378 [Hz] and 756 [Hz] as illustrated in FIG. 4.

The detection signal processing unit 25 outputs a signal to the filter control unit 26 so as to remove the "frequency component corresponding to the natural frequency" detected in this wing and the "harmonic component of the natural frequency" from the output signal of the sawtooth waveform generating unit 23 within a predetermined range (to be described later).

In the ringing removing process, the signal input to the detection signal processing unit 25 is transformed to the frequency domain and then frequencies of which the gain is equal to or greater than a predetermined value (hereinafter, referred to as a "second threshold value") G2 within a predetermined range (to be described later) at a frequency other than the frequency (60 [Hz]) of the external drive voltage. The second threshold value G2 is set as a value capable of being used to detect the frequency causing the ringing by experiments or the like and is stored in the storage unit in advance.

The detection signal processing unit 25 outputs a signal to the filter control unit 26 so as to remove the frequency component equal to or greater than the second threshold value G2 as a factor causing the ringing from the output signal of the sawtooth waveform generating unit 23. For example, in the example illustrated in FIG. 5, three frequencies greater than the second threshold value G2 are removed.

The detection signal processing unit 25 outputs a signal associated with the setting of the Q-value of the notch filter of the filter unit 24 in addition to the frequency value to be removed in the natural frequency detecting process and the ringing removing process. When setting the characteristics of the notch filter, the Q-value (the narrowness of a band in which passing is blocked, which means that as the larger this value is, the narrower the bandwidth is) of the notch filter is appropriately set within the range of a predetermined minimum value to a predetermined maximum value. FIGS. 6A and 6B are diagrams illustrating an input signal (left) to the notch filter, the waveform (center) in the notch filter, and the output signal (right) from the notch filter. FIG. 6A illustrates a case where the Q-value of the notch filter is high and FIG. 6B illustrates a case where the Q-value of the notch filter is low.

As shown in FIG. 6A, when the Q-value of the notch filter is high, there is a tendency to remove a high-frequency hand. When a voltage signal of a sawtooth waveform is input to the notch filter, a voltage signal of a waveform having a smooth shape such as a sinusoidal waveform is obtained. Therefore, the linearity of the waveform tends to degrade. When the Q-value of the notch filter is low, there is a tendency to leave the high-frequency band as a small gain. When a voltage signal of a sawtooth waveform is input to the notch filter, the ringing cannot be removed until it can be neglected in the scanning of the optical deflector.

Therefore, the Q-value of the notch filter is appropriately set within the range in which the linearity can be maintained in the 60 [%] section of one period of a sawtooth waveform (the range in which it is not close to a sinusoidal waveform) and the ringing not allowable in the sawtooth waveform can be removed in the scanning of the optical deflector. The Q-value of the notch filter is appropriately set depending on the sharpness of the gain of the frequency causing the ringing. For example, as a gain becomes sharper (as the frequency band having a high gain becomes narrower) or as a gain value becomes higher, the vibration of the reflection part 1 of the optical deflector A1 is more easily excited at frequencies around the frequency of the gain. Therefore, as a gain becomes sharper or as a gain value becomes higher, the Q-value of the notch filter is set to be smaller.

The detection signal processing unit 25 outputs information on the setting of a cutoff frequency of the low-pass filter as a signal. The cutoff frequency is appropriately set within a range in which the linearity of a waveform can be maintained and the ringing not allowable in a sawtooth waveform can be removed in the scanning of the optical deflector, similarly to the Q-value of the notch filter. Here, the cutoff frequency may be set to have a certain range and may be appropriately within the range.

Similarly, the "predetermined range" in the natural frequency detecting process and the ringing removing process is appropriately set within a range in which the linearity of a waveform can be maintained and the ringing not allowable in a sawtooth waveform can be removed in the scanning of the optical deflector, even when the mechanical natural frequency and the harmonic component of the natural frequency of the light deflector A1 are removed from the predetermined range.

The filter control unit 26 appropriately changes the characteristics of the filter unit 24 (the notch filter and the low-pass filter), that is, the resistance value of the variable resistor or the capacitance value of the variable capacitor, on the basis of the output of the detection signal processing unit 25.

As described above, when the use of the optical deflector A1 is started, the optical deflector A1 according to the present embodiment can detect one or more mechanical natural frequencies (resonance frequencies) relevant to the swinging of the movable part 9 of the optical deflector A1 about the second axis X2 through the use of the natural frequency detecting process in the frequency sweeping unit 21 and the detection signal detecting unit 25. In this wing, even when the natural frequency differs depending on the manufacturing error of the optical deflector A 1, it is possible to detect an appropriate natural frequency.

The detection signal processing unit 25 outputs a signal to the filter control unit 26 so as to remove the "frequency component of the detected natural frequency" and the "harmonic component of the frequency" within the predetermined range as described above. At this time, since the frequency component is removed only within the range in which the linearity of a waveform can be maintained, it is possible to suppress degradation of scanning speed uniformity of the optical deflector A1. In this wing, a voltage signal of a sawtooth waveform generated by the sawtooth waveform generating unit 23 becomes a voltage signal from which the natural frequency and the harmonic component of the natural frequency are removed by the filter unit 24 and is applied to the outside piezoelectric actuators 10a and 10b.

Figure 7B:
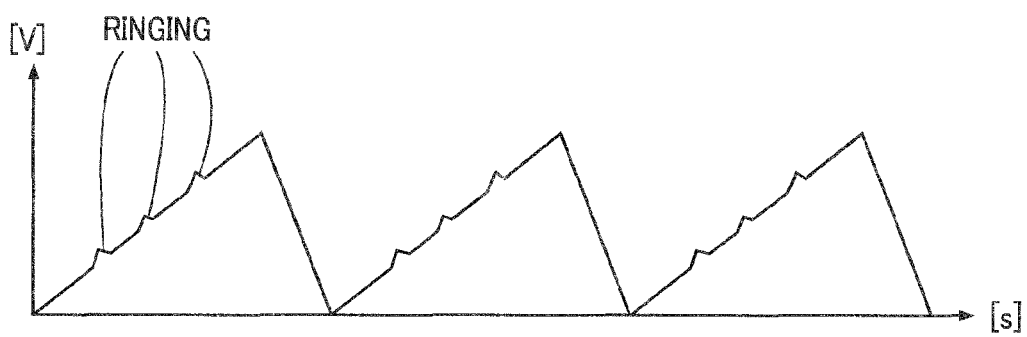
FIG. 7B is a diagram illustrating a voltage signal output from a detecting piezoelectric body when an outside drive voltage is applied to an outside piezoelectric actuator before performing the ringing removing process in the optical deflector according to the embodiment.

However, even by using this voltage signal, there is a possibility that the ringing may occur due to the resonance component other than the resonance frequency (FIG. 7B). In this case, through the use of the ringing removing process in the detection signal processing unit 25, the remaining frequency component causing the ringing can be removed by the voltage signal output from the detecting piezoelectric bodies 62 when the outside piezoelectric actuators 10a and 10b are driven.

The detection voltage output from the detecting piezoelectric bodies 62 includes the actual driving of the optical deflector A1. That is, when resonance occurs due to the frequency component included in the signal for actuating the optical deflector A1, a signal including the resonance component is included in the detection voltage. Accordingly, the drive voltage is controlled on the basis of the detection voltage output from the detecting piezoelectric bodies 62 (the actual scanning behavior is fed back to control the optical deflector A1).

Figure 7C:
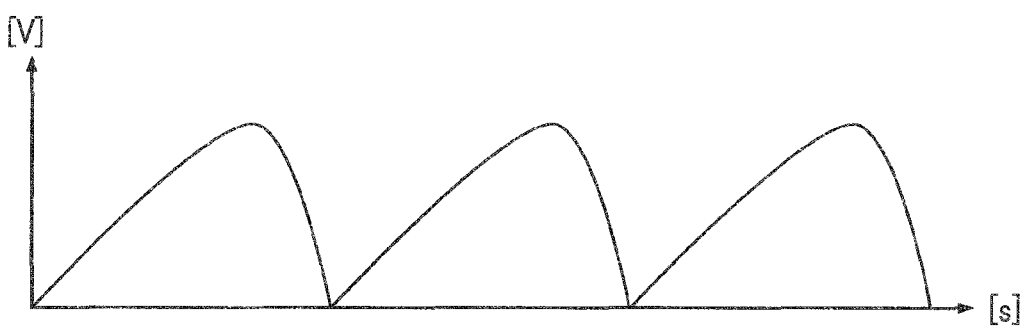
FIG. 7C is a diagram illustrating a voltage signal output from a detecting piezoelectric body when the outside drive voltage is applied to the outside piezoelectric actuator after performing the ringing removing process in the optical deflector according to the embodiment.

Accordingly, even when the natural frequency varies depending on the manufacturing error, the disturbance, the usage, or the like, it is possible to appropriately remove the ringing, as illustrated in FIG. 7C.

Since the frequency component is removed only within the range in which the linearity of a waveform can be maintained, it is possible to suppress degradation of scanning speed uniformity of the optical deflector A1. Accordingly, it is possible secure the scanning section which can be effectively used without increasing the deflection angle of the optical deflector A1.

The frequency sweeping unit 21 in the present embodiment corresponds to the "natural frequency detecting unit" in the present invention, the sawtooth waveform generating unit 23 corresponds to the "voltage signal generating unit" in the present invention, the filter unit 24 corresponds to the "removal unit" in the present invention, the detection signal processing unit 25 corresponds to the "natural frequency detecting unit" in the present invention, and the second threshold value G2 corresponds to the "predetermined value" in the present invention.

Although it is stated in the present embodiment that the control circuit 20 and the like are embodied by an electronic circuit, the invention is not limited to this configuration but the control circuit and the like may be embodied by a DSP (Digital Signal Processor) that processes a digital signal.

Although it is stated in the present embodiment that the optical deflector A1 swings about the first axis X1 and the second axis X2, the invention is not limited to this configuration, but the optical deflector may swing about a single axis.

REFERENCE SIGNS LIST

A1: optical deflector
X2: second axis (predetermined axis)

1b: thin metal film (reflective plane)
62: detecting piezoelectric body (detecting piezoelectric element)
9: movable part (mirror part)
10a, 10b: outside piezoelectric actuator (piezoelectric actuator)
11: support base (support part)
20: control circuit (control unit)
21: frequency sweeping unit (natural frequency detecting unit)
23: sawtooth waveform generating unit (voltage signal generating unit)
24: filter unit (removal unit)
25: detection signal processing unit (natural frequency detecting unit)
G2: second threshold value (predetermined value)

What is claimed is:

1. An optical deflector comprising:
a mirror part configured to have a reflective plane;
a support part configured to support the mirror part;
a piezoelectric actuator of which one end is connected to the mirror part, of which the other end is connected to the support part, and which swings the mirror part about a predetermined axis relative to the support part by piezoelectric driving;
a detecting piezoelectric element which outputs a detection voltage based on bending deformation due to vibration transmitted by the piezoelectric actuator, and
a control unit configured to control a drive voltage to be applied to the piezoelectric actuator,
wherein the control unit includes a natural frequency detecting unit configured to detect a mechanical natural frequency relevant to the swinging of the mirror part about the predetermined axis, a voltage signal generating unit configured to generate a voltage signal of a sawtooth waveform periodically repeating an increase and a decrease of a voltage value with a constant amplitude, and a removal unit configured to remove a predetermined frequency component, and
wherein a voltage signal obtained by removing the natural frequency detected by the natural frequency detecting unit and a harmonic component of the natural frequency from the voltage signal generated by the voltage signal generating unit within a predetermined frequency range is applied as the drive voltage to the piezoelectric actuator and thereafter a frequency component which is equal to or greater than a predetermined value within the predetermined frequency range, out of the frequency components of the detection voltage output from the detecting piezoelectric element, is removed from the drive voltage.

2. The optical deflector according to claim 1, wherein the natural frequency detecting unit includes a sinusoidal wave generating unit configured to generate a voltage signal of a sinusoidal waveform,
wherein the sinusoidal wave generating unit generates a voltage signal of a sinusoidal waveform for each frequency in the range of a predetermined first frequency to a second frequency, and
wherein the natural frequency detecting unit detects the frequency of the sinusoidal waveform, which is equal to or greater than a predetermined value out of the frequency components of the detection voltage output from the detecting piezoelectric element when the voltage signals of the sinusoidal waveform generated by the sinusoidal wave generating unit are applied to the piezoelectric actuator, as the natural frequency.

3. The optical deflector according to claim 1, wherein the piezoelectric actuator includes a plurality of piezoelectric cantilevers configured to be bending-deformed by piezoelectric driving, the plurality of piezoelectric cantilevers are arranged side by side so as to neighbor both ends of each piezoelectric cantilever, the ends are mechanically connected to fold back to the neighboring piezoelectric cantilever so as to accumulate the bending deformation, and the respective piezoelectric cantilevers are formed to be bending-deformed in a direction perpendicular to the arranging direction of the piezoelectric cantilevers.

* * * * *